Oct. 13, 1959

S. D. HOWE 2,908,832

HYSTERESIS CLUTCH

Filed Aug. 17, 1955

INVENTOR
Spencer D. Howe
BY
Henry Heyman
ATTORNEY

Oct. 13, 1959　　　　　S. D. HOWE　　　　2,908,832
HYSTERESIS CLUTCH
Filed Aug. 17, 1955　　　　　　　　　　　2 Sheets-Sheet 2

INVENTOR
Spencer D. Howe
BY
Henry Heyman

ATTORNEY

United States Patent Office 2,908,832
Patented Oct. 13, 1959

2,908,832

HYSTERESIS CLUTCH

Spencer D. Howe, Los Angeles, Calif., assignor to Hughes Aircraft Company, Culver City, Calif., a corporation of Delaware Application August 17, 1955, Serial No. 528,872

3 Claims. (Cl. 310—99)

This invention relates to clutch devices, and particularly to clutch devices for providing controlled torque outputs.

In systems which manipulate, or utilize forces, it is often desired to convert a value represented by electrical signals to a value represented by a torque. The torque may then be employed to effect a physical control, such as a braking or a driving control, of a related member or system. Such conversions are used in many modern applications, as in automatically controlled aircraft navigation systems, in automatically controlled machinery, in analogue devices and in devices which at least partially employ analogue functions.

One such signal conversion which has been particularly difficult to attain in the past is the conversion of the difference in two input signals to a torque which is independent of rate of rotation. The devices of the prior art which are sufficiently accurate have been too complex and cumbersome. Further, they have not been fully reliable or sufficiently long wearing. In many of the above applications size, reliability, and accuracy are all critical factors.

Accordingly, it is an object of this invention to provide an improved device, simpler and more reliable than the devices of the prior art, for converting electrical signal values to a torque independent of speed of rotation.

It is another object of this invention to provide an improved arrangement for generating a torque in response to the difference in two input signals, which arrangement is characterized by reliability, accuracy and compactness.

It is a further object of this invention to provide an improved clutching arrangement for providing output torques in response to two input variables, which arrangement is more compact and requires less parts than the arrangements of the prior art.

It is another object of this invention to provide an improved mechanical arrangment for clutches to be employed in opposition on the same output shaft.

In accordance with this invention, the difference in two electrical signals may be converted to an output torque by a pair of hysteresis clutches coupled to an output shaft. Each clutch may include an external gear and an attached hysteresis ring rotatably mounted on the output shaft. Flux path members for the two hysteresis clutches may include a central member common to both the clutches, and an individual member for each clutch. Fingers on the central member may be interleaved with fingers on the individual flux path members, to define the major portion of a flux path about the flux generating coil of each clutch. The clutch housings may be rotated oppositely and at approximately equal speeds and outputs from a differential amplifier applied to the different ones of the clutches. The hysteresis rings provide a mechanical loss in the associated clutch dependent on the signal applied and the difference in the actions of the two clutches is the net torque provided to the output shaft. A double contact thrust ball bearing may be employed between the clutches to provide lateral and thrust stability for the structure.

The novel features of the invention, as well as the invention itself, both as to its organization and method of operation, will best be understood from the following description, when taken in connection with the accompany drawings, in which like numbers refer to like parts, and in which.

Figure 1:
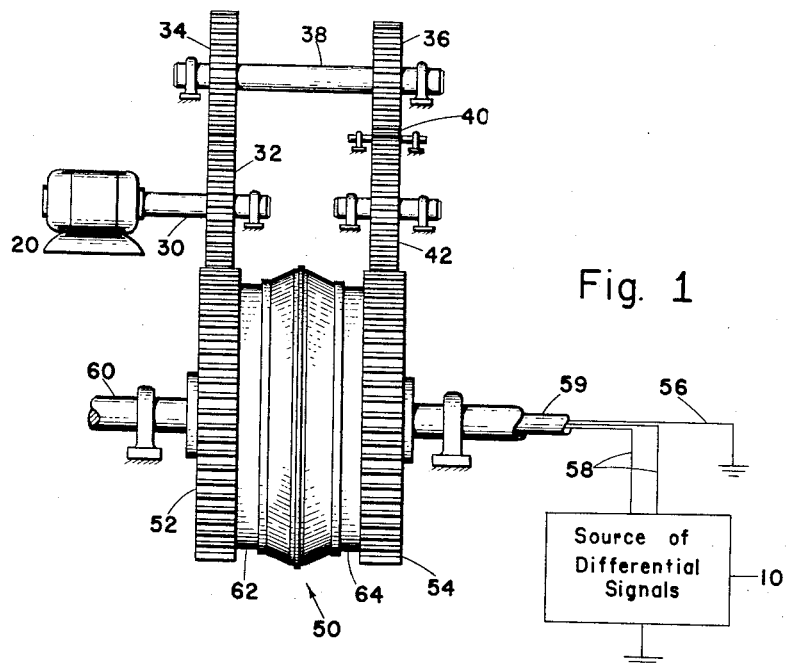
Fig. 1 is a schematic drawing of one arrangement, employing a hysteresis clutch, for practicing the invention.

An arrangement in accordance with the invention, referring now to Fig. 1, may be employed to provide a controlled torque which is depedent on differential signals derived from a source 10. The arrangement will be referred to as a clutch device, by which term it is here intended to include devices for both braking and driving applications. The source of differential signals 10 may be, for example, a differential amplifier. As is well known, differential amplifiers provide two output voltage levels, the difference between these levels being determined by an applied input signal. When no input signal exists, the two voltage levels are substantially the same, and when the input signal is a maximum, the difference in the voltage levels is a maximum.

A source of rotational movement, such as a motor 20, provides input rotations for the system. Rotations in opposite senses are provided through a gearing mechanism driven from the motor shaft 30. For simplicity in description the rates of rotation here chosen are equal in magnitude. One driving gear 32 is mounted directly on, and driven by, the motor shaft 30. A second driving gear 42 is powered from the first driving gear 32 through a gear train consisting of a pair of gears 34, 36 coupled to a rotatably mounted common shaft 38, and an idler gear 40. The first driving gear 32 rotates the common shaft 38 through gear 34 and the second driving gear 42 is rotated through gear 36 and the coupling idler gear 40. The idler gear 40 provides the desired reversal of rotation.

A clutch mechanism 50 derives input rotations from the two driving gears 32, 42 and employs these rotations in applying torque to an output shaft 60 under control of the source of differential signals 10. If a driving arrangement is to be employed, the output shaft 60 may be freely rotatable, while if a braking arrangement is to be employed, the shaft 60 may be driven from an external source (not shown). The clutch mechanism 50 has a first input gear 52 driven by the first driving gear 32, and a second input gear 54 driven by the second driving gear 42. Signals for the clutch mechanism 50 are derived from a lead 56 coupled to a common connection, here shown by way of example as a ground lead 56, and signal input leads 58 coupled to the source of differential signals 10. A nonmetallic sleeving 59 insulates the leads 56, 58 from other parts of the system.

The clutch mechanism 50 comprises two like sections, each of which utilizes a hysteresis clutch arrangement. The hysteresis clutches are contained within separate ring housings 62, 64, to which the input gears 52, 54 respectively, may be coupled. Here the input gears 52, 54 are integral with the ring housing 62, 64. The output shaft 60 is rotatably mounted and provides support to the remainder of the clutch system.

Figure 2:
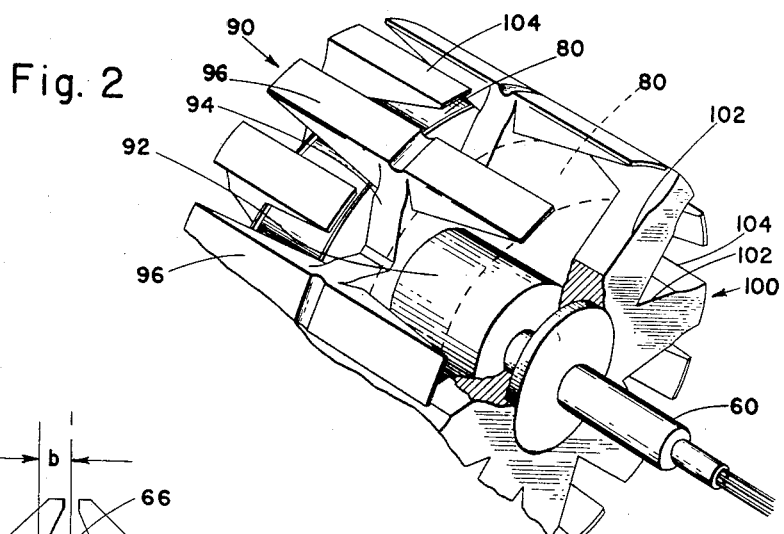
Fig. 2 is a fragmentary perspective view of an internal portion of the hysteresis clutch of Fig. 1.
Figure 3:
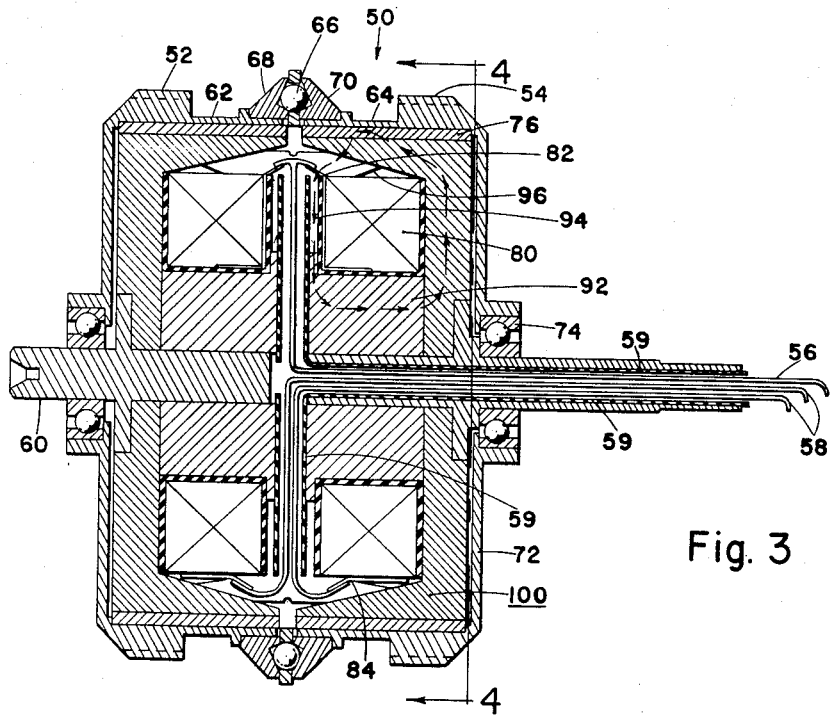
Fig. 3 is a front view, in section, of a hysteresis clutch which may be employed in the arrangement of Fig. 1.
Figure 4:
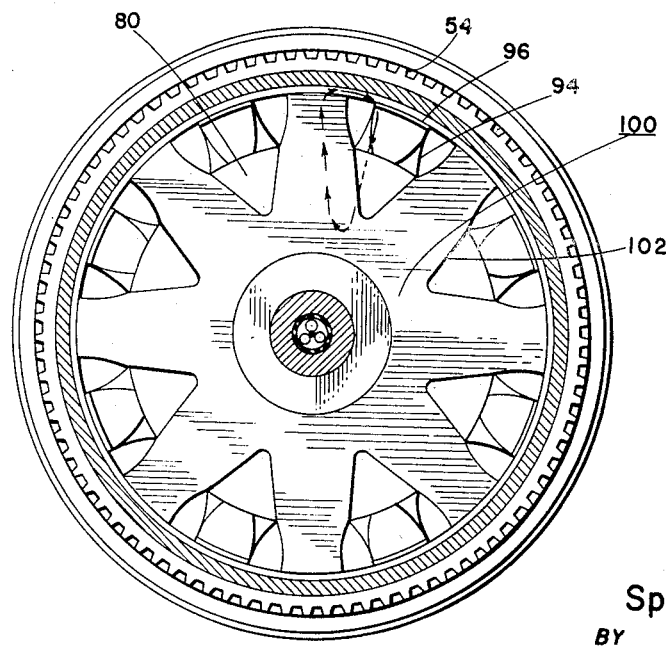
Fig. 4 is an end sectional view of the arrangement of Fig. 3 taken along the line 4—4 of Fig. 3 looking in the direction of the appended arrows.

The clutch mechanism 50 is shown in greater detail in Figs. 2, 3, and 4. Referring now to those figures, it will be seen that the arrangement is essentially symmetrical. The left and right sections, as viewed in Fig. 3, will hereafter be referred to as the first and second clutches, respectively. Only the second clutch is numbered and will be described in detail as to elements which are found in both clutches. Parts which are common to both clutches will be described individually. The ring housings 62, 64 of the two clutches are coupled together by a ball bearing arrangement consisting of a plurality of balls 66 riding in double contact bearing raceways 68, 70 fixed to the ring housings 62, 64 respectively.

An end plate 72 is fixed to the ring housing 64 of the second clutch. A ball bearing 74 mounted between the end plate 72 and the output shaft 60 provides a rotatable mount for the ring housing 64 on the output shaft 60. A ring of hysteresis material 76 is mounted within the ring housing 64, concentric with the housing 64 and fixed thereto. By hysteresis material is meant a magnetic material of high hysteresis loss, for example, a 36% cobalt steel. The remainder of the hystersis clutch is associated with the hysteresis ring 76 and the output shaft 60.

A coil 80 is mounted within the hysteresis ring 76 concentric with and between the ring 76 and the output shaft 60. The two ends of the coil 80 terminate at metallic tabs 82, 84, extending outward radially from the coil 80. The ground and signal leads 56 and 58 respectively, are each coupled to a different tab 82, 84 respectively. If the rotation of the mechanism is through only a small angle, the leads 56, 58 themselves may be twisted, as in the arrangement shown. If rotation is through a considerable angle, or is continuous, conventional riding contacts, such as brush members (not shown), may be employed at selected points.

The coil 80 is wound about a central flux path member 90 fixed to the output shaft 60 and concentric therewith. The central flux path member 90 (best seen in Fig. 2) has the shape of a central hub 92 concentric with the output shaft 60, and a plurality of radial arms 94 extending radially from the central hub 92. Terminating crossarms 96 are provided at the end of each radial arm 94, and extend normal to the arm 94 in both directions parallel to the longitudinal axis of the output shaft 60. As best seen in Fig. 3, a central aperture is provided for the electrical leads 56, 58 in the central flux path member 90. The coil 80 is wound about the central hub portion 92 on one side of the radial arms 94, and between the terminating crossarms 96 and the central hub 92.

An end flux path member 100, comprising a disk member having radial spokes 102 is mounted on the output shaft 60 adjacent the central hub 92. At the end of each spoke 102 is provided a finger 104 extending normal to the spoke 102 toward the central flux path member 90.

The fingers 104 on the end flux path member are interleaved with the fingers 96 of the central flux path member 90.

For each hysteresis clutch a complete flux path around the coil 80 is provided by the flux path members 90, 100 and the hysteresis ring 76. The flux paths are the same for each radial arm 94 on the central flux path member 90 and the adjacent spoke 102 on the end flux path member 100.

Typically, a flux path follows the route designated by broken lines in Figs. 3 and 4. From the central hub 92 of the central flux path member 90, the flux path may extend through a spoke 102 and out a finger 104 of the end flux path member 100. The flux may then cross the gap to the hysteresis ring 76 and travel in the hysteresis ring 76 to the adjacent crossarm 96 of the adjacent central flux path member radial arm 94. The flux path may then be completed through the radial arm 94 to the point of origin in the central hub 90. As is pointed out in greater detail below, the radial arms 94 of the central flux path member 90 carry flux from the coils of both clutches.

In operation, referring now to Figs. 1, 2, 3 and 4, the arrangement of Fig. 1 provides a variable output torque at output shaft 60 dependent upon signals from the source of differential signals 10. The motor 20 rotates the input gears 52, 54 at equal speeds and in opposite directions through the coupling gear train. If desired, the gear teeth on the input gears 52, 54 may be angled to provide thrust from each of the input gears 52, 54 toward the center of the clutch mechanism 50. With equal signals provided on the signal leads 58 from the source of differential signals 10 the actuating signals for the two hysteresis clutch sections with the clutch mechanism 50 are the same. Therefore, the actions of the two clutch sections cancel each other, and no output torque of the output shaft 60 is produced.

When a signal difference does exist on the signal input leads 58, the arrangement provides an output torque which is linear with respect to the signal difference and independent of the rates of rotation. The operation of each hysteresis clutch section employs the controlled dissipation of energy in the hysteresis ring 76 to control the amount of torque provided to the output shaft. Because the input gears 52, 54 rotate in opposition, the torques provided are also in opposition. Because the characteristic curve of hysteresis material such as the 36% cobalt steel previously mentioned is a parabola, the employment of clutches in opposition results in a linear difference output. Therefore, accurate outputs, proportional to the differential signals applied, are provided.

It will be noted that the dotted line representing the flux path in Fig. 3 passes through the central flux path member 90, the end flux path member 100, and the encompassing hysteresis ring 76. With respect to a small discrete area of the hysteresis ring 76, the effect is a reversal of magnetization each time the area passes a crossarm 96 on the central flux path member 90, or a finger on the end flux path member 100. When a small area is adjacent a terminating crossarm 96, its magnetic polarization is like that of the crossarm 96. As the hysteresis ring rotates, however, the same small area crosses to the adjacent finger 104 of the end flux path member 100, and the small area is magnetized in an opposite polarity. Energy is required to provide this constant reversal of direction of magnetization of the elemental areas of the hysteresis ring 76. This energy is derived from the motor 20 driving the individual hysteresis clutch section. The energy expended per revolution is the same, regardless of the speed of rotation. Thus the torque exerted is independent of the speed. The amplitude of the signal determines the intensity of the flux through the flux path members 90, 100 of the hysteresis clutch section. The greater the flux, the greater the torque exerted by the rotating hysteresis ring 76 on the flux path members 90, 100. The hysteresis ring 76, which is rotatably mounted with respect to the output shaft 60 through the coupling bearings 74, thus seeks to drag along the associated section of the clutch mechanism 50. Some counteracting force is supplied in the opposite direction by the other clutch section, but the result, if a signal exists, is a torque on the clutch mechanism 50 and the output shaft 60.

The present system is described as employed in an application in which the output shaft 60 is rotated only through some 90° by an external control device, while at the same time a controlled torque is applied to the shaft by the clutch mechanism 50. Therefore, the signal leads 56, 58 may be allowed to twist with the shaft 60, although a brush or slipring arrangement could be employed if desired or required. Lateral and thrust stability is provided by the double contact thrust ball bearing arrangement 66, 68, 70 described in more detail below.

The central flux path member 90 provides a path for the flux from both hysteresis clutch sections of the clutch mechanism 50. The central flux path member so arranged provides particular advantages in compactness and economy. Because differential input signals are employed, the central flux path member 90 need only be large enough to contain the maximum flux from either one of the hysteresis clutch sections. When the flux from one of the sections is a maximum, the flux from the other is zero. Thus a considerable saving of core material is derived. In addition, both hysteresis clutch sections are arranged around the central flux path member 90, providing an overall arrangement which is characterized by simplicity and economy.

As signals from the source of differential signals 10 vary, the output, which is the torque on the output shaft 60, varies almost instantaneously. The clutch mechanism 50 has no wearing parts, and as previously described, provides a linear output. The accuracy is the same, regardless of the rate at which the output shaft 60 is rotated. The reversal of magnetization in the hysteresis ring 76 results in the dissipation of energy in the form of heat in the hysteresis ring 76. Where the rate of output rotation is not high, and where the forces involved are not large, the heat may be dissipated without special provision for cooling. In other circumstances, it may be desired to employ cooling mechanisms and techniques of well known types.

Figure 5:
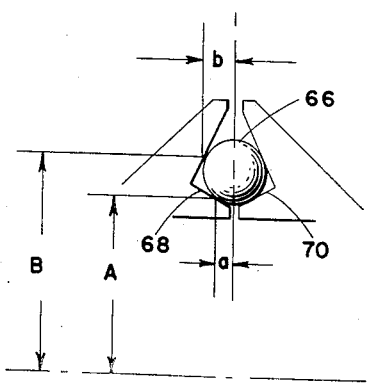
Fig. 5 is a detailed view of a double contact ball thrust bearing which may be employed in an arrangement for practicing the invention.

Referring now to Fig. 5, the angular contact thrust bearing provided stabilizes the two sections of the clutch mechanism 50 (Fig. 3) both laterally and in a thrust direction. The grooved raceways 68, 70 are so shaped that each contact surface is normal to the ball bearing 66, and the two points of contact are equidistant from the centerline of the ball bearing 66 along a direction normal to the plane in which the ball bearing 66 moves. The relationship observed between the points of contact is that of $$\frac{a}{A} = \frac{b}{B}$$

where $a$ and $b$ are the distances of the points of contact from the centerline of the plane of revolution, and $A$ and $B$ are the distances of the points from the axis of revolution. Employment of such a thrust bearing arrangement greatly reduces the size of the system.

Thus there has been provided an improved clutch device for converting the difference between two variable electrical inputs into an output torque, which may be made independent of rate of rotation. The inputs may be the difference between two signals, as provided from a differential amplifier. The arrangement operates accurately and rapidly, is not subject to wear, and is characterized by extreme simplicity and compactness.

What is claimed is:

1. A system for converting the difference between two electrical signals to torque on an output shaft, independent of the rate of rotation of said output shaft, said system comprising: an output shaft which may be rotated; a pair of hysteresis clutches each having an input member rotatably mounted on said output shaft, said clutches including a common member coupled to said output shaft forming a flux path extending radially from said output shaft, and each having a hysteresis ring between said input and output members and in fixed relation to the input member, each of said clutches being responsive to a different one of said electrical signals; and a double contact ball thrust bearing between the input members of said hysteresis clutches.

2. A clutch arrangement comprising a shaft; a central hub member fixedly mounted on said shaft, said hub member having radially extending arms normal to said shaft forming a flux path extending radially from said output shaft and terminating crossarms at the ends of said arms and parallel to said shaft; coil members of cylindrical shape concentric with said shaft and wound about said hub member, one coil member being mounted on each side of said central hub member; a pair of spoked disk members, said spoked disk members having fingers extending from the ends of said spokes normal to said spokes, said fingers and said terminating crossarms being interleaved to provide flux paths about the associated coil; a pair of rings of hysteresis material concentric with said shaft, each of said rings being about and operatively associated with said central hub member and a different one of said spoked disk members to complete a flux path therebetween; and a pair of driving housings rotatably mounted on said output shaft and each fixed to a different one of said hysteresis rings for rotating said rings.

3. A device for providing a shaft torque in response to a difference in applied input signals comprising: a rotatable shaft for providing the desired output torques; a central hub member concentric with and fixed to said shaft and including a base hub adjacent said shaft, a web portion extending outwardly from said base hub, and a plurality of finger members extending from said web portion in both axial directions parallel to said shaft; first and second cylindrical flux generating members, each mounted about the base hub on a different side of the web portion of the central hub member; first and second disk members mounted on said shaft, each adjacent a different one of said flux generating members and each having a plurality of fingers extending normal to the disk portion thereof, said fingers interleaving with the fingers of said central hub member to provide, with said hub member, flux paths about each flux generating member; means to energize said flux generating members responsive to said different input signals to provide flux therefrom; first and second housings concentric with said first and second flux generating members, respectively, each being rotatably mounted about said output shaft; first and second rings of hysteresis material coupled to said first and second housings, respectively, and each in operative relation to the flux path of the associated flux generating member to intercept said flux path; and means to drive said housings in opposite directions.

References Cited in the file of this patent

UNITED STATES PATENTS

| | | |
|---|---|---|
| 829,015 | Johnson | Aug. 21, 1906 |
| 2,583,523 | Winther | Jan. 22, 1952 |
| 2,603,678 | Helmer | July 15, 1952 |
| 2,651,754 | Perry | Sept. 8, 1953 |
| 2,679,604 | Joeschke | May 25, 1954 |
| 2,718,157 | Schaub | Sept. 20, 1955 |
| 2,745,974 | Oetzel | May 15, 1956 |
| 2,806,158 | Emery et al. | Sept. 10, 1957 |

FOREIGN PATENTS

| | | |
|---|---|---|
| 720,476 | Germany | May 7, 1942 |
| 740,603 | Germany | Oct. 25, 1943 |
| 1,010,804 | France | Mar. 26, 1952 |